June 4, 1940.    V. MILICH    2,203,539
CASTER
Filed Oct. 18, 1937
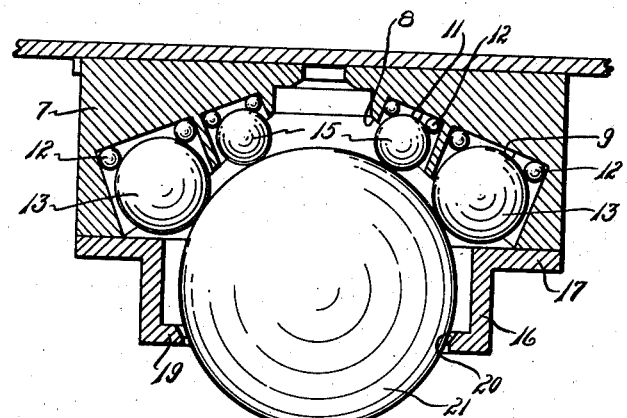
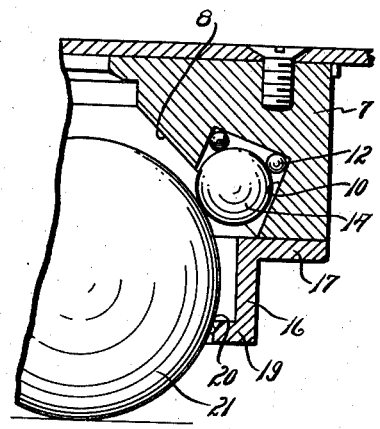
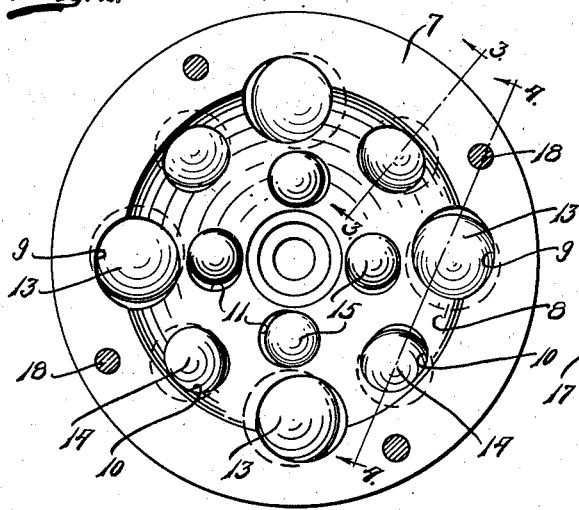
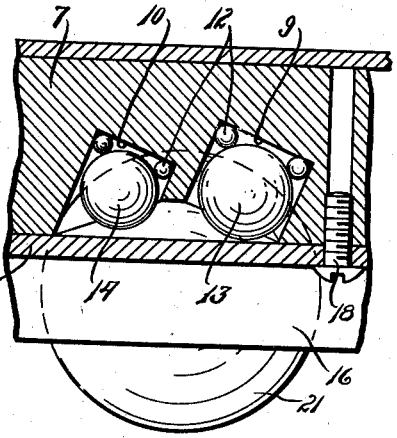
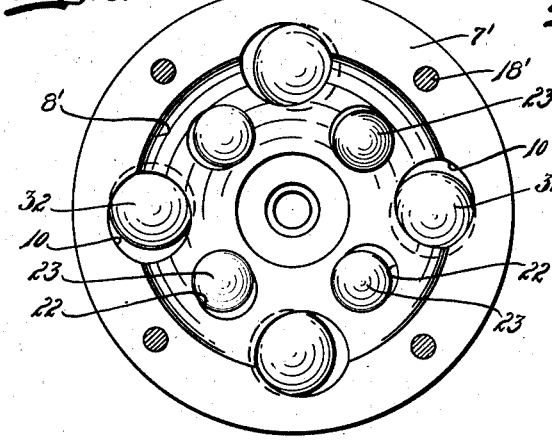
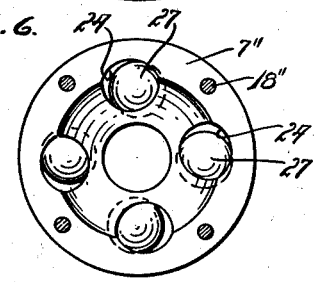
INVENTOR.
VLADA MILICH
BY Thos. L. Donnelly
ATTORNEY.

Patented June 4, 1940

2,203,539

UNITED STATES PATENT OFFICE 2,203,539

CASTER

Vlada Milich, Detroit, Mich.

Application October 18, 1937, Serial No. 169,564

2 Claims. (Cl. 16—26)

My invention relates to a new and useful improvement in a caster and has for its object the provision of a caster which will be simple in structure, economical of manufacture, durable, highly efficient in use and compact.

Another object of the invention is the provision of a caster so arranged and constructed that the contact member will freely rotate thus preventing a marring or scratching of the surface over which it may be drawn.

Another object of the invention is the provision of a supporting body having a plurality of pockets formed therein in which antifriction members may be positioned and also provided with a retainer adapted for retaining a portion of these antifriction members in position and at the same time serving as a retainer for a contact member.

Other objects will appear hereinafter.

The invention consists in the combination and arrangement of parts hereinafter described and claimed.

The invention will be best understood by a reference to the accompanying drawing which forms a part of this specification and in which, Fig. 1 is a central, vertical, sectional view of the invention.

Fig. 2 is a bottom plan view of the supporting member.

Fig. 3 is a fragmentary, sectional view taken on line 3—3 of Fig. 2.

Fig. 4 is a fragmentary, sectional view taken on line 4—4 of Fig. 2.

Fig. 5 is a bottom plan view of a slightly modified form of the invention.

Fig. 6 is a bottom plan view of a further modified form of the invention.

In the form shown in Fig. 1, the invention comprises a supporting body 7 adapted for attachment to the structure with which used. This body 7 is provided, on its under surface, with a conical recess 8 in which is formed a row of outer recesses 9 and a row of outer recesses 10, the recesses 10 alternating with the recesses 9 and being of smaller diameter. Positioned inwardly of these rows 9 and 10 and concentric therewith, is a row of recesses 11 which are smaller than the recesses 10. Positioned in each of these recesses is a plurality of ball bearings 12 and positioned in each of the recesses 9 is a large ball bearing 13 which substantially fills the recesses 9 but is still of such a diameter as to permit sufficient play to facilitate easy rotating of the ball 13. Positioned in the recesses 10 are the large ball bearings 14 which also substantially fill the recess in which positioned. A similar ball bearing 15 is positioned in each of the recesses 11. These ball bearings 13, 14 and 15 engage against the smaller ball bearings 12 which are positioned in the recesses. A cup-shaped retainer 16 provided with the peripheral flange 17 is secured to the supporting body 7 by screws 18 projected through the flange 17. At the lower end of this retainer 16 there is an inwardly projecting flange 19 having the beveled inner edge 20. It is obvious that the retainer 16 may, if desired, be formed from a stamping. Positioned in the retainer 16 is a contact ball or curvilinear member 21 of such a diameter that it cannot be withdrawn from the retainer 16 through the opening at its lower end. This contact ball 21 engages against the balls 13, 14 and 15 when pressure is placed against the ball 21 and this ball 21 always engages against these balls 13, 14 and 15 sufficiently to retain them in the recesses in which they are positioned. The balls 13, 14 and 15 are preferably formed from steel or other suitable hard material to resist the crushing pressure as are likewise the balls 12. The contact member 21, however, may be formed from glass, a fibrous composition, rubber or any other suitable yieldable, nonabrasive material so that when the caster is used on a polished or finished floor, it will ride over the floor without marring or scratching. At the same time, the contact member 21, because of its yieldability serves to present such frictional engagement with the surface over which it rolls as to effect the rotation of the member 21 so that, always under pressure when moved, the contact member 21 will rotate and will not be dragged in a stationary manner over the floor surface.

It will be noted that the retainer 16 overlies the cavity 8 sufficiently to retain the balls in the recesses 9 and 10 in position and prevent their disengagement from these recesses.

In assembly, it is but necessary to invert the member 7 and the various balls may then be dropped into their respective recesses after which the contact member 21 may be placed in position and then the retainer 16 secured to the supporting body 7.

It will be noted that the recesses are in cross section substantially cylindrical and drilled at such an angle as to extend diagonally to the surface 8 and diagonally to the axis of the supporting body 7 but never so as to pass through the axis of the supporting body.

In Fig. 5 I have shown a slightly different form of arrangement. The row of recesses 10 is positioned outwardly from a row 22 of smaller recesses and in each of these recesses the balls 32 and 23 are positioned. In the form shown in Fig. 6, but a single row of recesses 24 is provided in each of which is positioned a ball 27. The recesses in the form shown in Fig. 5 and Fig. 6 are extended diagonally to the surface 8 and diagonally to the axis of the body 7 and yet in a direction so as not to pass through the axis of the body 7.

It is believed obvious that the device may be easily and quickly assembled and that it is also durable in structure. The use of the antifriction members for engaging the contact member serves to increase the efficiency of the device and render it one which entirely eliminates any scratching or marring of the surface over which the caster may be drawn.

While I have illustrated and described the preferred form of construction I do not wish to limit myself to the precise detail of structure shown but desire to avail myself of such variations and modifications as may come within the scope of the appended claims.

What I claim as new is:

1. A caster of the class described, comprising: a supporting body having a conical recess formed in one of its faces, there being a plurality of concentric rows of elongated spaced recesses formed in the face of said conical recess and having their longitudinal axes parallel to each other and extended at an angle to the face of said conical recess and to the axis of said supporting body, the bases of said spaced recesses being planar and extended at an angle to the face of said conical recess, the recesses on the inner rows being smaller than the recesses on the outer rows; an antifriction member positioned in each of said recesses, said antifriction member substantially filling the recess in which positioned; a plurality of small antifriction members engaging the base of the recess and serving to retain the first-mentioned antifriction member inserted in the recess out of contact with the base of the recess; a spherical contact member engaging said first-named antifriction members and rotatable thereon; means for retaining said contact member in position for engaging said antifriction members, said last-named means overlying the outer row of said antifriction members for retaining the same in their recesses.

2. A caster of the class described, comprising: a supporting body having a recess formed in one of its faces, there being a plurality of concentric rows of elongated spaced recesses formed in the face of said first named recess and having their longitudinal axes parallel to each other and extended at an angle to the face of the said first mentioned recess and to the axes of said supporting body, the bases of said spaced recesses being planar and extended at an angle to the base of said first mentioned recess, the recesses on the inner rows being smaller than the recesses on the outer rows; an antifriction member positioned in each of said recesses, said antifriction members substantially filling the recess in which positioned; a spherical contact member engaging said first-named antifriction members and rotatable thereon; means for retaining said contact member in position for engaging said antifriction members, said last-named means overlying the outer row of said antifriction members for retaining the same in their recesses.

VLADA MILICH.